United States Patent [19]

Scheer et al.

[11] Patent Number: 4,772,163

[45] Date of Patent: Sep. 20, 1988

[54] MACHINE TOOL SPINDLE AND TOOLHOLDERS SUITABLE THEREFOR

[75] Inventors: Gerhard Scheer; Erich Raff, both of Loechgau, Fed. Rep. of Germany

[73] Assignee: Komet Stahlhalter-und Werkzeugfabrik Robert Breuning GmbH, Besigheim, Fed. Rep. of Germany

[21] Appl. No.: 119,814

[22] Filed: Nov. 12, 1987

[30] Foreign Application Priority Data

Nov. 25, 1986 [DE] Fed. Rep. of Germany ....... 8631442

[51] Int. Cl.$^4$ .......................... B23Q 3/12; B23B 31/02
[52] U.S. Cl. .................................. 409/232; 408/239 R; 409/234
[58] Field of Search ........................ 409/232, 234, 233; 408/239 A, 239 R, 238; 279/1 A, 1 ME, 1 R, 75, 8

[56] References Cited

U.S. PATENT DOCUMENTS

| | | | |
|---|---|---|---|
| 3,115,065 | 12/1963 | Kulusic | 409/233 |
| 3,311,023 | 3/1967 | Kaiser | 409/233 X |
| 3,554,080 | 1/1971 | Herrmann | 409/234 |
| 3,788,657 | 1/1974 | Sutton | 279/1 A X |
| 3,884,120 | 5/1975 | Diferdinando | 409/234 |
| 4,226,562 | 10/1980 | Schmid et al. | 409/233 |
| 4,412,767 | 11/1983 | Schmid et al. | 409/234 |
| 4,619,566 | 10/1986 | Botimer | 409/232 |
| 4,684,301 | 8/1987 | Eckle | 409/232 |

FOREIGN PATENT DOCUMENTS

| | | | |
|---|---|---|---|
| 1017317 | 5/1950 | France | 279/8 |
| 8700465 | 1/1987 | PCT Int'l Appl. | 279/1 R |

Primary Examiner—William R. Briggs
Attorney, Agent, or Firm—Flynn, Thiel, Boutell & Tanis

[57] ABSTRACT

A machine tool spindle (1) serving to receive toolholders (13) with different shanks (8, 16) by turns has a frustoconical receiving bore (3) in its head (1a) for receiving a steep-angle taper shank of a first toolholder. The spindle head (1a) is provided with an end face (4) surrounding the frustoconical receiving bore (3). Immediately adjoining this end face there is provided a first nesting bore (8) whose diameter (D) is slightly greater than the theoretical diameter of the frustoconical receiving bore (3) in the plane of the end face (4). The axial length of the nesting bore (8) is only about 10-15% of the theoretical diameter. The nesting bore (8) serves to receive a first cylindrical nesting shoulder (15) of the second toolholder (13). At the inner end of the receiving bore (3) there is provided a second nesting bore (40) into which a second nesting shoulder (41) is arranged at that end of the toolholder (13) which is located in the spindle fits.

8 Claims, 2 Drawing Sheets

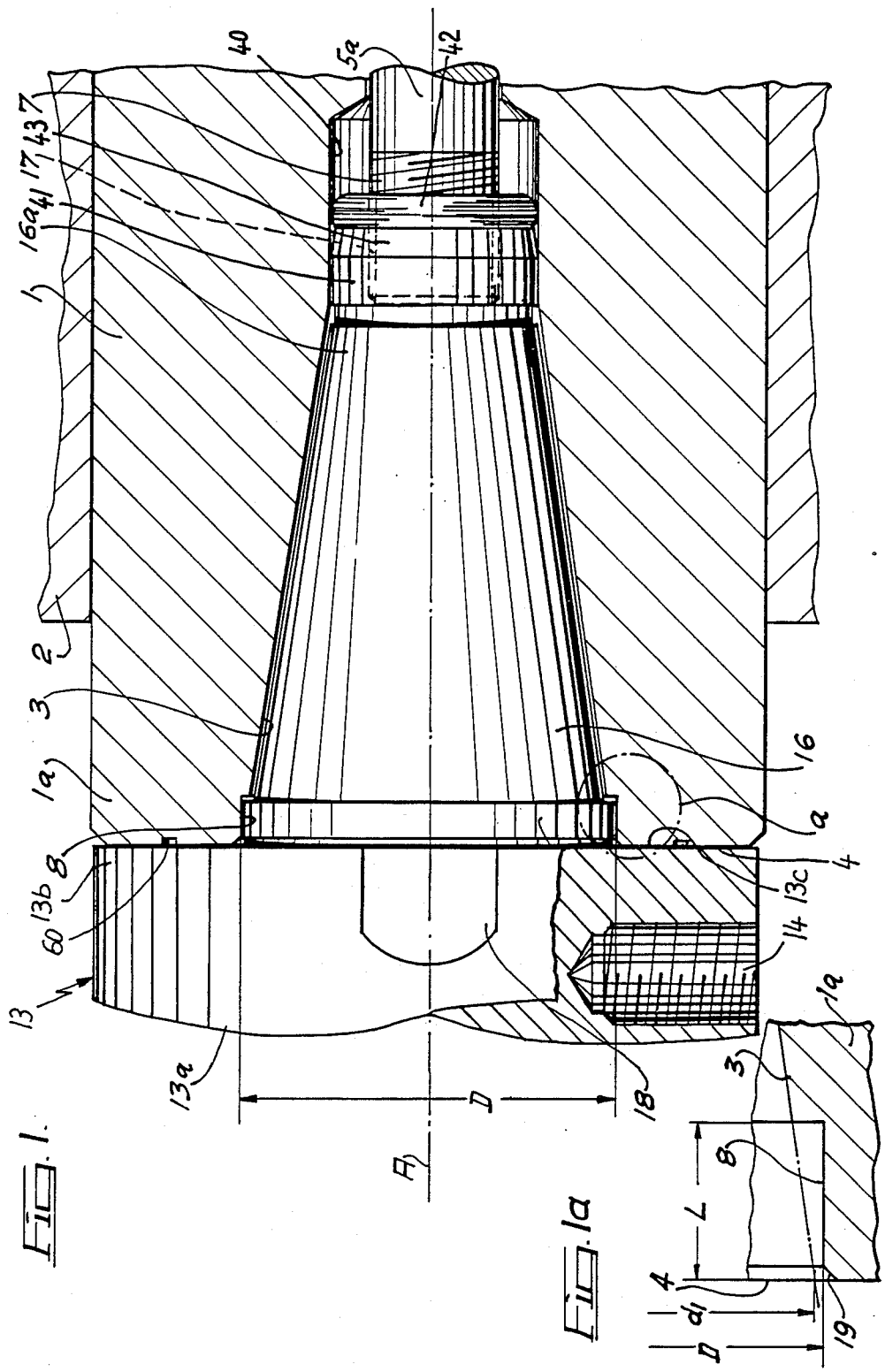

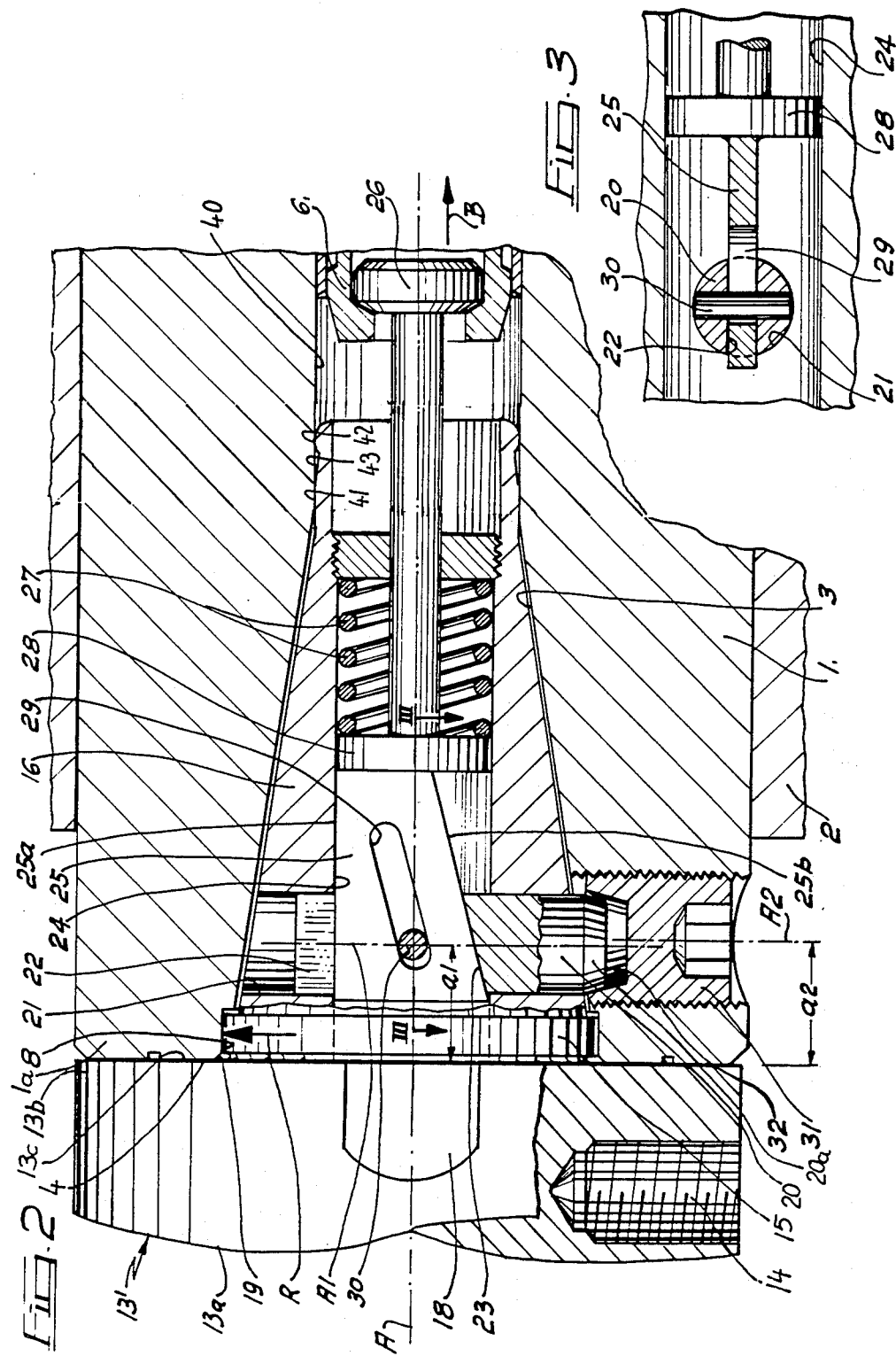

MACHINE TOOL SPINDLE AND TOOLHOLDERS SUITABLE THEREFOR

This invention relates to a machine tool spindle and to toolholders suitable therefor having different shanks and insertable by turns into the spindle head, the spindle having a frustoconical receiving bore for receiving a steep-angle taper shank of a first toolholder, an end face surrounding the receiving bore and, in the zone of the frustoconical receiving bore, a cylindrical nesting bore for receiving a cylindrical nesting shoulder on the shank of a second toolholder provided at one end of the nesting shoulder with a flange concentric with the shoulder and, at the other end of the nesting shoulder, with a truncated cone engaging with a clearance in the frustoconical receiving bore on abutment of the flange against the end face, the nesting bore being immediately adjacent the end face and its diameter being slightly greater than the theoretical diameter of the frustoconical receiving bore in the plane of the end face, and the axial length of the nesting bore being only about 10–15% of the theoretical diameter.

The problem underlying the invention is to improve a machine tool spindle of this kind and toolholders suitable thereofor so that, when a toolholder with a cylindrical shoulder is used, a particularly stable connection with high centring accuracy exists between the spindle head and the tool, the wear in the region of the centring diameter being reduced to a minimum.

According to the invention, this is achieved in that a second cylindrical nesting bore is provided in the spindle head adjoining the smallest diameter of the frustoconical receiving bore, and a second cylindrical nesting shoulder which fits into the second nesting bore is arranged on the second toolholder adjoining the smallest diameter of the truncated cone.

Due to this development, the toolholder is supported in multiple manner on the spindle. Support takes place not only through the medium of the two nesting shoulders provided at a fairly large distance from one another, but additionally also through abutment of the flange against the end face of the spindle. Transverse forces acting transversely of the axis of the spindle are transferred from the toolholder to the spindle and vice versa in optimum manner by the two nesting shoulders. This is advantageous in particular in the case of weighty, top-heavy tools. Moreover, on insertion of the toolholder in the receptacle of the spindle head, pre-centring of both parts is obtained when the second cylindrical nesting shoulder is just engaging in the second nesting bore. This is again of particular importance in the case of weighty, top-heavy tools, because these can then be inserted fully automatically more quickly, the wear in the region of the centring diameter being reduced to a minimum.

A particularly advantageous development of the invention consists in that at the free end of the toolholder located in the spindle there is provided a torus concentric with the axis of the toolholder and whose diameter is smaller by a few hundredths of a millimeter than the diameter of the second nesting shoulder, and between the torus and the nesting shoulder there is provided a frustoconical transition portion whose greatest diameter immediately adjoins the second nesting shoulder and corresponds to the diameter thereof.

On insertion of the toolholder in the spindle head, the said torus arrives first in the second nesting bore. Since it is slightly smaller in diameter than the nesting bore and, moreover, has a rounding in addition it can be introduced comparatively easily into the nesting bore, a pre-centring already taking place between the shank of the toolholder and the spindle head. If the shank of the toolholder is then pushed still further into the spindle head, the frustoconical transition portion takes over further guiding until the second cylindrical nesting shoulder slides into the second nesting bore. In this way, wear is reduced to a minimum. Moreover, the clearance between the second nesting bore and the second nesting shoulder can be kept very small, of the order of magnitude of about 0.002–0.004 mm, which contributes to the improvement of the accuracy of centring.

Further advantageous developments of the invention are characterised in the remaining sub-claims.

The invention is described in detail in the following with reference to embodiments shown in the drawing, in which:

FIG. 1 shows a first embodiment, partly in longitudinal section;

FIG. 1a shows details of the area a in FIG. 1 on a larger scale;

FIG. 2 shows a second embodiment, partly in longitudinal section;

FIG. 3 is a partial section on the line III—III in FIG. 2.

The machine tool spindle 1 is rotatably mounted in the headstock 2. At its head 1a, the machine tool spindle 1 has a frustoconical receiving bore 3 which is formed in accordance with DIN 2079 or the corresponding ISO standard. The receiving bore 3 is surrounded by a plane, annular end face 4 extending perpendicularly to the spindle axis A. Moreover, a clamping rod 5a is mounted to be axially movable in a central bore of the spindle 1, the clamping rod bearing a collet 6 at its front end in the zone of the frustoconical receiving bore 3 and being axially movable towards the spindle head 1a in opposition to the force of cup springs (not shown) (FIG. 2).

As shown in FIG. 1, instead of the collet 6, the clamping rod 5a could also have a thread 7 and be rotatably mounted in the spindle 1.

Immediately adjoining the end face 4, the spindle head 1a has a cylindrical nesting bore 8 in the zone of the receiving bore 3. The diameter D of this nesting bore is only slightly greater, by about 1 mm, than the theoretical diameter d1 which the frustoconical receiving bore 3 would have in the plane of the end face 4. This theoretical diameter d1 is laid down in DIN 2079 and, for example, for spindle head size No. 50, is 69.95 mm. Details concerning this theoretical diameter d1 and the diameter D of the nesting bore 8 are shown in FIG. 1a. The fitting bore 8 is made comparatively short in the axial direction and its axial length L, measured from the end face 4, should be about 10–15%, preferably about 12%, of the theoretical diameter d1. The diameter D of the nesting bore 8 is finished with a tolerance of +0.002 to +0.005 mm.

A first toolholder which, at its free end, may bear any desired tool (not shown), for example a boring head, an inside turning or hollowing tool, a milling cutter, a reamer or the like, can be inserted with its steep-angle taper shank, which is formed in accordance with DIN 2080 or 69871, into the frustoconical receiving bore in the machine tool spindle 1, as is described in detail in the Parent German Pat. No. 35 21 799 with reference to FIG. 4.

Shown in FIG. 1 is a second toolholder 13 at whose free end 13a again a tool (not shown) is arranged. The toolholder 13 moreover has a flange 13b. Immediately adjacent the flange 13b the toolholder 13 has a cylindrical nesting shoulder 15 which should fit with as small radial tolerances as possible into the nesting bore 8. The diameter of the nesting shoulder 15 is finished with a tolerance of about −0.003 mm. The axial length of the nesting shoulder 15, measured from the annular surface 13c of the flange 13b, is slightly shorter, by about 0.5 mm, than the axial length of the nesting bore 8, so that it is ensured that the toolholder 13 always bears fully with its annular surface 13c against the end face 4 of the spindle head 1a without the nesting shoulder 15 being seated on the bottom or back of the nesting bore 8.

Adjoining the nesting shoulder 15 is a truncated cone 16 which, however, is so dimensioned that a little clearance is present between the surface of the truncated cone 16 and the frustoconical receiving bore 3 when the annular surface 13c bears against the end face 4. At the free end 16a of the truncated cone, similarly to FIG. 4, a tightening pin cooperating with a collet may again be provided, or else, as shown in FIG. 1, an internal thread 17 into which the clamping rod 5a can be screwed by means of its external thread 7. In this case, the clamping rod is mounted to be only rotatable, but not axially movable, in the spindle 1 and the toolholder 13 is drawn into the spindle head 1a under the action of the threads 7, 17 engaging in one another. In the process, the toolholder 13 is accurately centred with respect to the spindle 1 by means of the nesting shoulder 15 engaging in the nesting bore 8. Moreover, the flange 13b is pressed at its annular surface 13c against the end face 4. Since the truncated cone 16 engages in the receiving bore 3 with a clearance, the pressing of the annular surface 13c against the end face 4 takes place with the full clamping or tightening force of the clamping rod 5a or of the threads 7, 17. Transverse forces which act on the toolholder 13 are transferred to the spindle in the immediate vicinity of the end face 4 via the nesting shoulder 15 and the nesting bore 8. Moreover, for transmitting the torque, the conventional driving pieces in accordance with DIN 2079 may be arranged on the spindle head 1a, the driving pieces engaging in two diametrically opposite driving slots 18 arranged in the flange 13b.

On introduction of the toolholder 13 into the spindle head 1a, the truncated cone 16 serves first of all as a coarse guide. The truncated cone 16 engaging in the frustoconical receiving bore 3 effects a pre-centring of the toolholder. Since, however, there is a step between the cylindrical nesting shoulder 15 and the largest diameter of the truncated cone 16, it is appropriate to provide a chamfer 19 between the end face 4 and the cylindrical nesting bore 8, which chamfer may extend, for example, at 45° with respect to the spindle axis A. The radial extent of this chamfer must be at least as great as half the difference in diameter between the nesting shoulder 15 and the greatest diameter of the truncated cone 16 in the zone of the nesting shoulder 15. The chamfer 19 as a centring action on the nesting shoulder 15 and facilitates its introduction into the nesting bore 8. Instead of the chamfer 19 on the spindle head 1a, a chamfer of suitable size could also be provided at the transition between the nesting shoulder 15 and the truncated cone 16. It would also be conceivable to provide both a chamfer 19 on the spindle head and a chamfer on the cylindrical nesting shoulder 15, in which case the radial extents of the two chamfers together would have to be greater than half the difference in diameter between the nesting shoulder 15 and the greatest diameter of the truncated cone 16.

The spindle head 1a has furthermore a cylindrical nesting bore 40 adjoining the smallest diameter of the frustoconical receiving bore 3. The second toolholder 13 is furthermore provided with a second cylindrical nesting shoulder 41 adjoining the smallest diameter of the truncated cone 16, this shoulder fitting into the second nesting bore 40. Moreover, at the free end of the toolholder 13 which is located in the spindle there is provided a torus 42 concentric with the axis A of the toolholder and whose diameter is smaller by a few hundredths of a millimeter, namely by about 0.02–0.05 mm, than the diameter of the second nesting shoulder 41. Between the torus 42 and the nesting shoulder 41 there is provided a frustoconical transition portion 43 whose greatest diameter immediately adjoins the second nesting shoulder 41 and corresponds to the diameter thereof. On insertion of the toolholder 13 in the spindle head 1a, the torus 42 arrives in the nesting bore 40 first. Since it is smaller by a few hundredths of a millimeter than the nesting bore and, moreover, is rounded off at its end face, it can easily enter the nesting bore 40. Because of this, a pre-centring takes place between the toolholder 13 and the spindle head 1a. On the toolholder being pushed further into the spindle head 1a, the frustoconical transition portion 43 takes over further centring until the nesting shoulder 41, devoid of any transition, enters the nesting bore 40. Due to this conformation, it is possible to limit the clearance between the nesting shoulder 41 and the nesting bore 40 to 0.002–0.004 mm. In this way, a high accuracy of centring is achieved. Despite the slight clearance, owing to the described conformation, even weighty, top-heavy tools can be inserted quickly and without any problems, while reducing wear to a minimum.

The force of the cup springs acting on the clamping rod 5a is fixed in already existing machine tools and also cannot be increased as desired for reasons of space. For this reason and, above all things, in order to increase accuracy of repetition in the case of multiple tool change, i.e. in order to keep change tolerance as small as possible, the clamping device shown in FIG. 2 is advantageously provided. In this clamping device, a cylindrical clamping piece 20 is radially slidable in the truncated cone 16 in a transverse bore 21 serving as a guide. At its outer end, the clamping piece 20 has a truncated cone 20a or an inclined surface extending obliquely with respect to the spindle axis A. Moreover, the clamping piece 20 has a longitudinal slot 22 terminating in a wedge surface 23 extending obliquely with respect to the spindle axis A. A wedge 25 is axially slidable in an axial bore 24 in the truncated cone 16. The wedge 25 is supported by its back 25a in the axial bore 24. The wedge 25 is fixedly connected to the tightening rod 26. A compression spring 27 presses on a cylindrical collar 28 provided between the tightening rod 26 and the wedge 25 and attempts thereby to push the wedge towards the nesting shoulder 15. The wedge 25 moreover has a slot 29 extending parallel to the surface 25b of the wedge. A transverse pin 30 fixed in the clamping piece 20 engages with a clearance in this slot 29. In the spindle head 1a, a screw 31 having a frustoconical recess 32 is screwed in radially. The centre angles of this frustoconical recess 32 and of the frustoconical end 20a of the clamping piece 20 are of equal size. The axis A1 of the clamping piece 20 is arranged at a distance a1 from the annular surface 13c which is a little smaller than the distance a2 of the axis A2 of the screw 31 from the end face 4. The conformation of the toolholder 13' shown in FIG. 2 as regards the flange 13b, the nesting shoulder 15 and the truncated cone 16, as well as additional parts, corresponds to the embodiment shown in FIG. 1, for which reason the same reference symbols have been used for corresponding parts and the above description is to be applied accordingly.

As long as the toolholder 13' is not clamped tightly in the spindle 1, the wedge 25 is pushed forward towards the nesting shoulder 15 under the action of the spring 27. Through the medium of the slot 29 and the transverse pin 30, the clamping piece 20 is moreover held with its frustoconical end 20a within the truncated cone 16. When the tightening rod 26 is gripped by the collet 6 and drawn by it in the direction B, the wedge 25 likewise moves in the direction B, its surface 25b sliding along the wedge surface 23 of the clamping piece 20 and pushing the latter outward radially. In the process, the frustoconical end 20a applies itself against the frustoconical recess 32. Due to the axial offset of the axes A1 and A2, the annular surface 13c is pressed against the end face 4. The wedge surfaces 23 and 25b and the surfaces of the truncated cones 20a and 32 produce at the same time an intensification of the clamping force generated by the plate springs acting on the clamping rod 5a. As a result of the bearing of the frustoconical end 20a against the frustoconical recess 32, a reaction force R occurs in the radial direction and presses the nesting shoulder 15 always in the same direction against the nesting bore 8 at a point diametrically opposite the screw 31. By this means, the desired great accuracy of repetition with small exchange tolerances is achieved. In FIG. 2, the clamping piece 20 has been shown at some distance from the nesting shoulder 15 solely for reasons of clarity. It should, however, be arranged in the greatest possible proximity to the nesting shoulder 15 in order to avoid possible tilting forces which could arise through the unilateral radial moving out of the clamping piece 20. If the clamping piece 20 is brought closer up to the nesting shoulder 15, the axial length of the truncated cone 16 can also be shortened.

In the embodiment shown in FIG. 2, a clamping piece 20 is mounted to be slidable in the transverse bore 21. If need be, it would also be conceivable to provide two oppositely movable clamping pieces which are moved radially outwards by means of oppositely directed wedge surfaces. In this case, suitable counter-surfaces for the second clamping piece would then have to be provided on the spindle, for example in the form of a second screw diametrically opposite the screw 31. Likewise, it is possible to employ other conformations of the clamping pieces, such as are described with reference to FIGS. 5 and 6 of German Pat. No. 35 21 799, in combination with the special design of that end of the toolholder which is located in the spindle and of the inner end of the receiving bore.

The embodiments of the invention in which an exclusive property or priviledge is claimed are defined as follows:

1. In a machine tool spindle and toolholders suitable therefor having different shanks and insertable by turns into the spindle head, the spindle having a frustoconical receiving bore for receiving a steep-angle taper shank of a first toolholder, an end face surrounding the receiving bore and, in the zone of the frustoconical receiving bore, a cylindrical nesting bore for receiving a cylindrical nesting shoulder on the shank of a second toolholder provided at one end of the nesting shoulder with a flange concentric with the shoulder and, at the other end of the nesting shoulder, with a truncated cone engaging with a clearance in the frustoconical receiving bore on abutment of the flange against the end face, the nesting bore being immediately adjacent the end face and its diameter being slightly greater than the theoretical diameter of the frustoconical receiving bore in the plane of the end face, and the axial length of the nesting bore being only about 10-15% of the theoretical diameter, the improvement wherein a second cylindrical nesting bore is provided in the spindle head adjoining the smallest diameter of the frustoconical receiving bore, and a second cylindrical nesting shoulder which fits into the second nesting bore is arranged on the second toolholder adjoining the smallest diameter of the truncated cone.

2. The machine tool spindle according to claim 1, wherein at the free end of the toolholder located in the spindle there is provided a torus concentric with the axis of the toolholder and whose diameter is smaller by a few hundredths of a millimeter than the diameter of the second nesting shoulder, and between the torus and the nesting shoulder there is provided a frustoconical transition portion whose greatest diameter immediately adjoins the second nesting shoulder and corresponds to the diameter thereof.

3. The machine tool spindle according to claim 2, wherein the torus is smaller in diameter by about 0.02 to 0.05 mm than the second nesting shoulder.

4. The machine tool spindle according to claim 1, wherein the diameter of the first nesting bore is greater by about 1 mm than the theoretical diameter.

5. The machine tool spindle according to claim 1, wherein the axial length of the first nesting bore is about 12% of the theoretical diameter.

6. The machine tool spindle according to claim 1, wherein a chamfer bridging the difference in diameter between the nesting shoulder and the truncated cone is provided between the end face and the first cylindrical nesting bore.

7. The machine tool spindle according to claim 1, wherein between the taper shank and the first nesting shoulder there is provided a chamfer bridging the difference in diameter of the two parts.

8. The machine tool spindle according to claim 1, wherein in the truncated cone, in the zone of the first nesting shoulder, at least one clamping piece is slidable in a radial guide, the clamping piece being movable radially by means of a wedge surface acting at its inner end and connected to the tightening rod axially slidable in the truncated cone, and being provided at its free outer end with a thrust surface which can be pressed against an associated counter-surface provided on the spindle.

* * * * *